Feb. 10, 1959
C. G. THIENE ET AL
2,873,013
PRINTING MACHINE
Filed Feb. 8, 1957
10 Sheets-Sheet 6
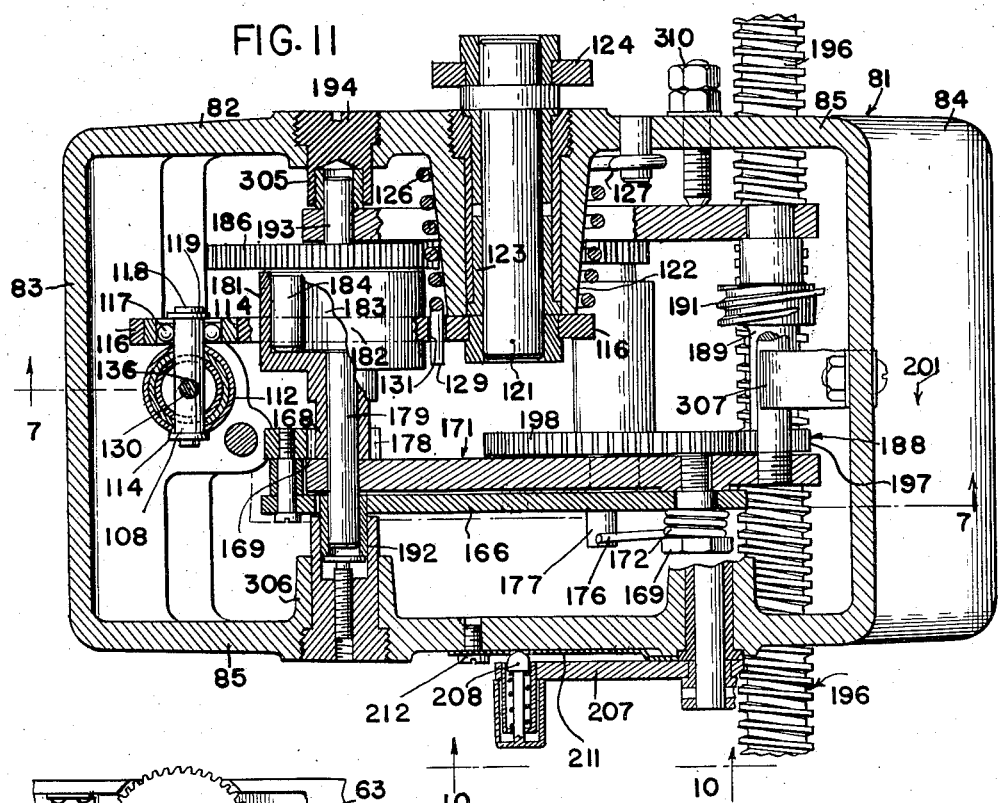
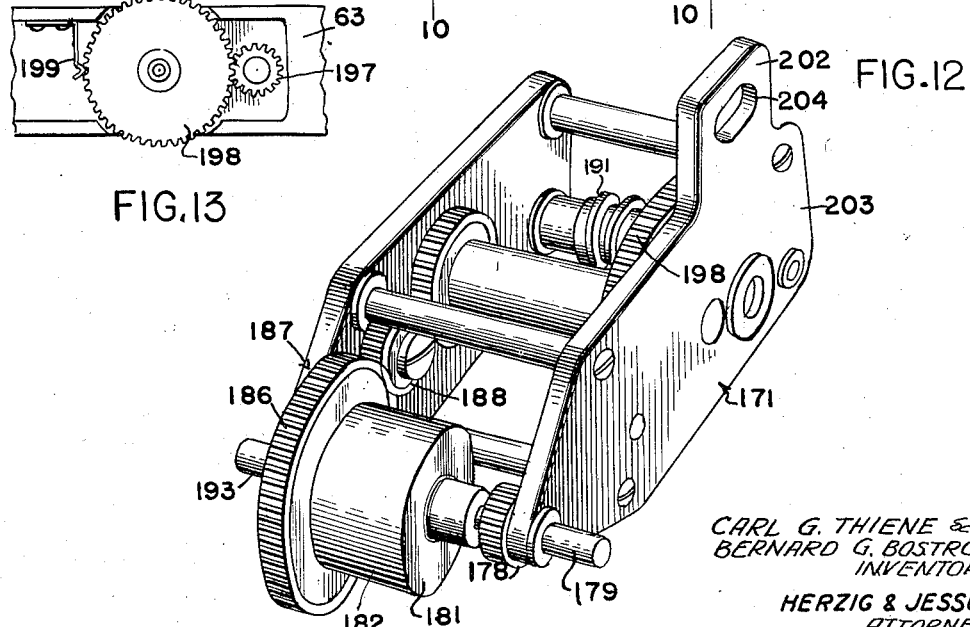
CARL G. THIENE &
BERNARD G. BOSTROM
INVENTORS.
HERZIG & JESSUP,
ATTORNEYS.
BY
Albert M. Herzig

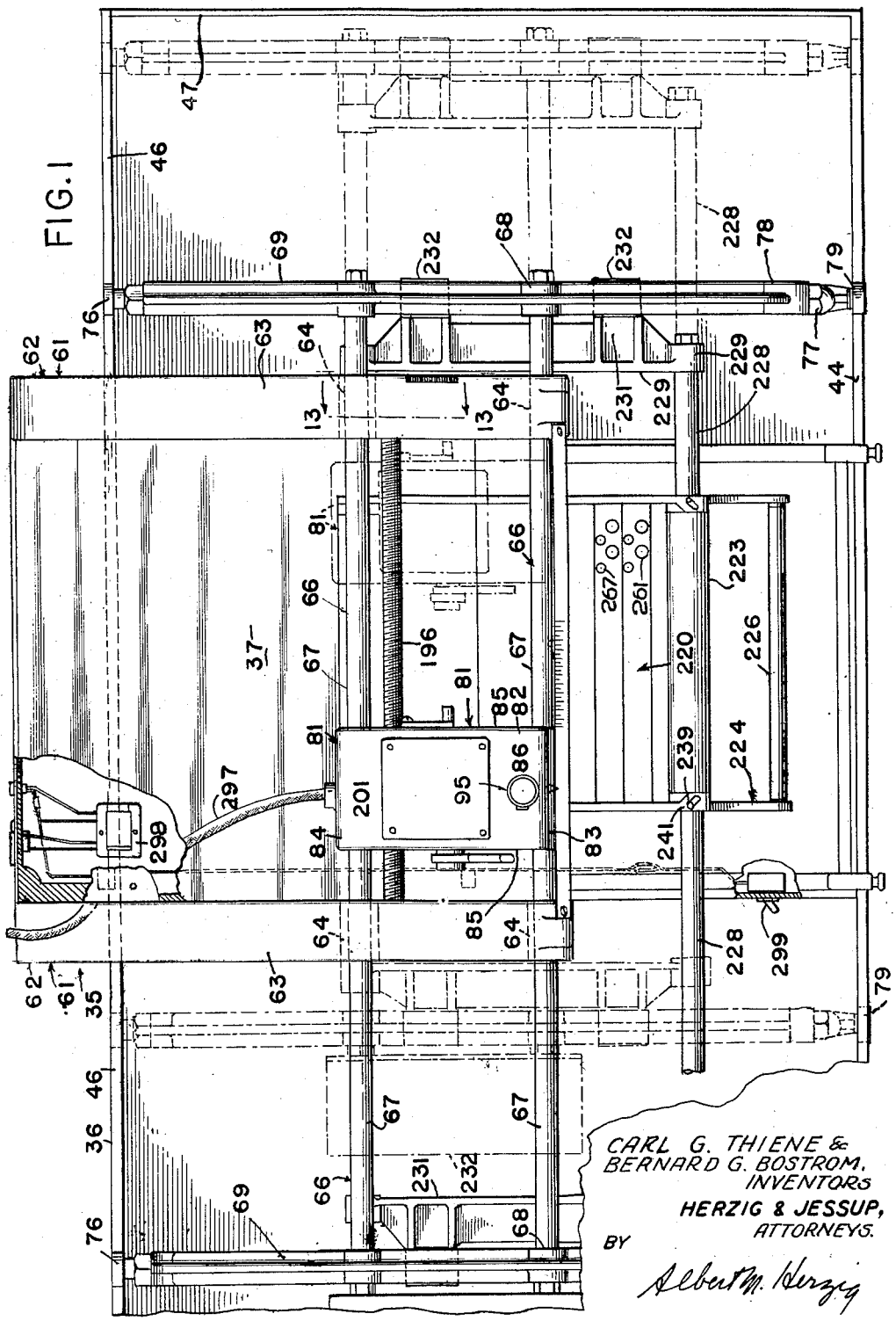

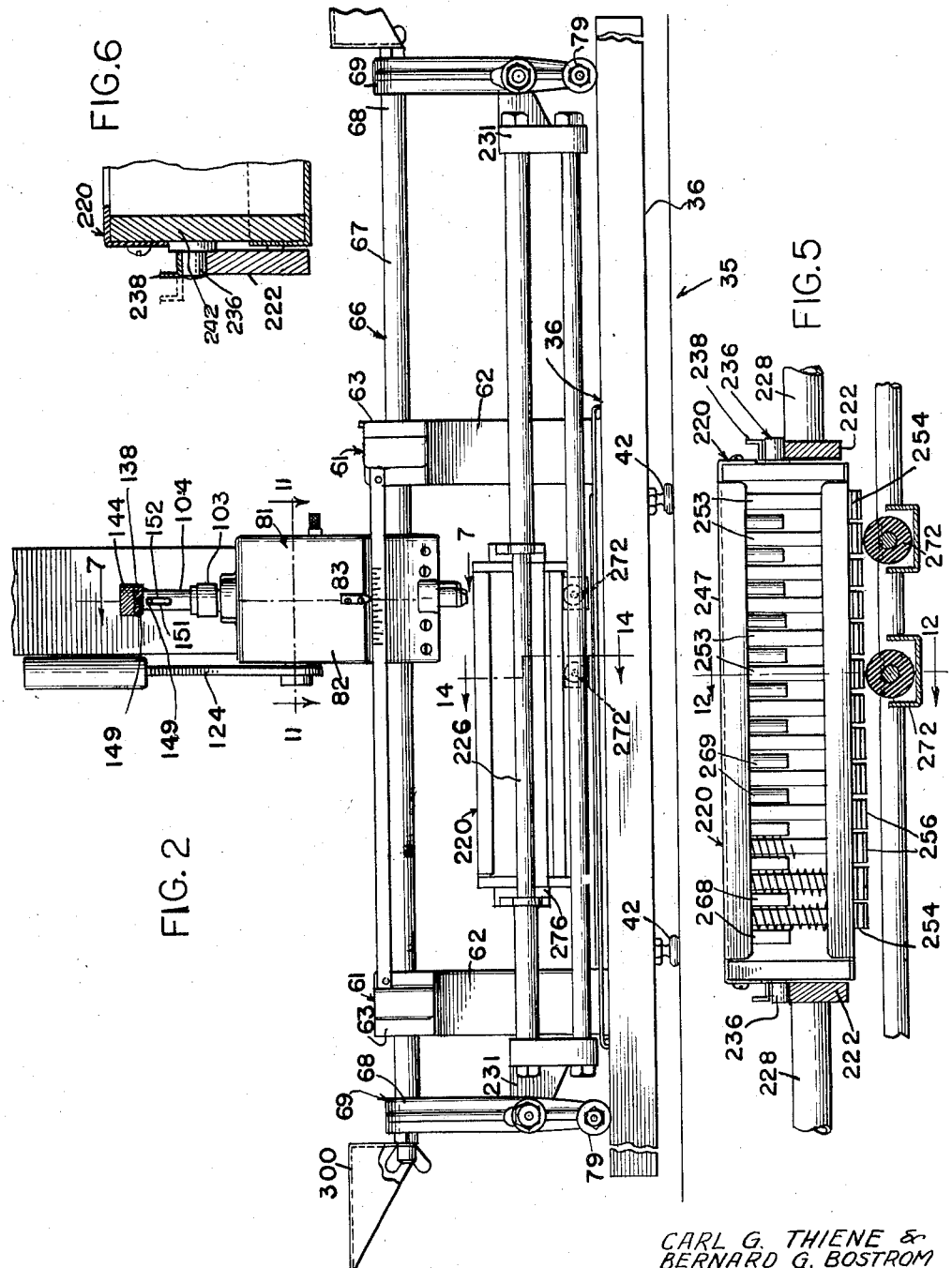

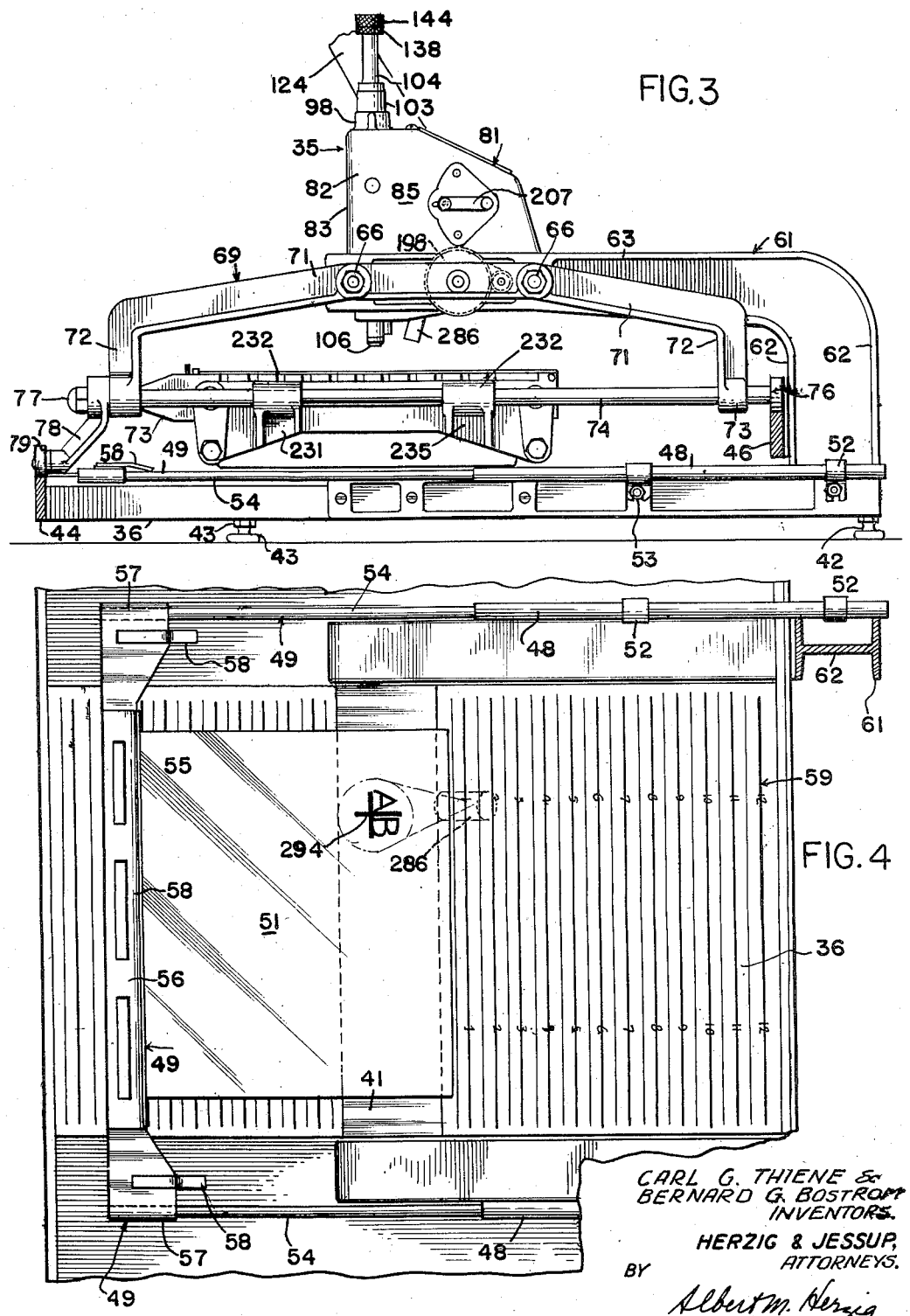

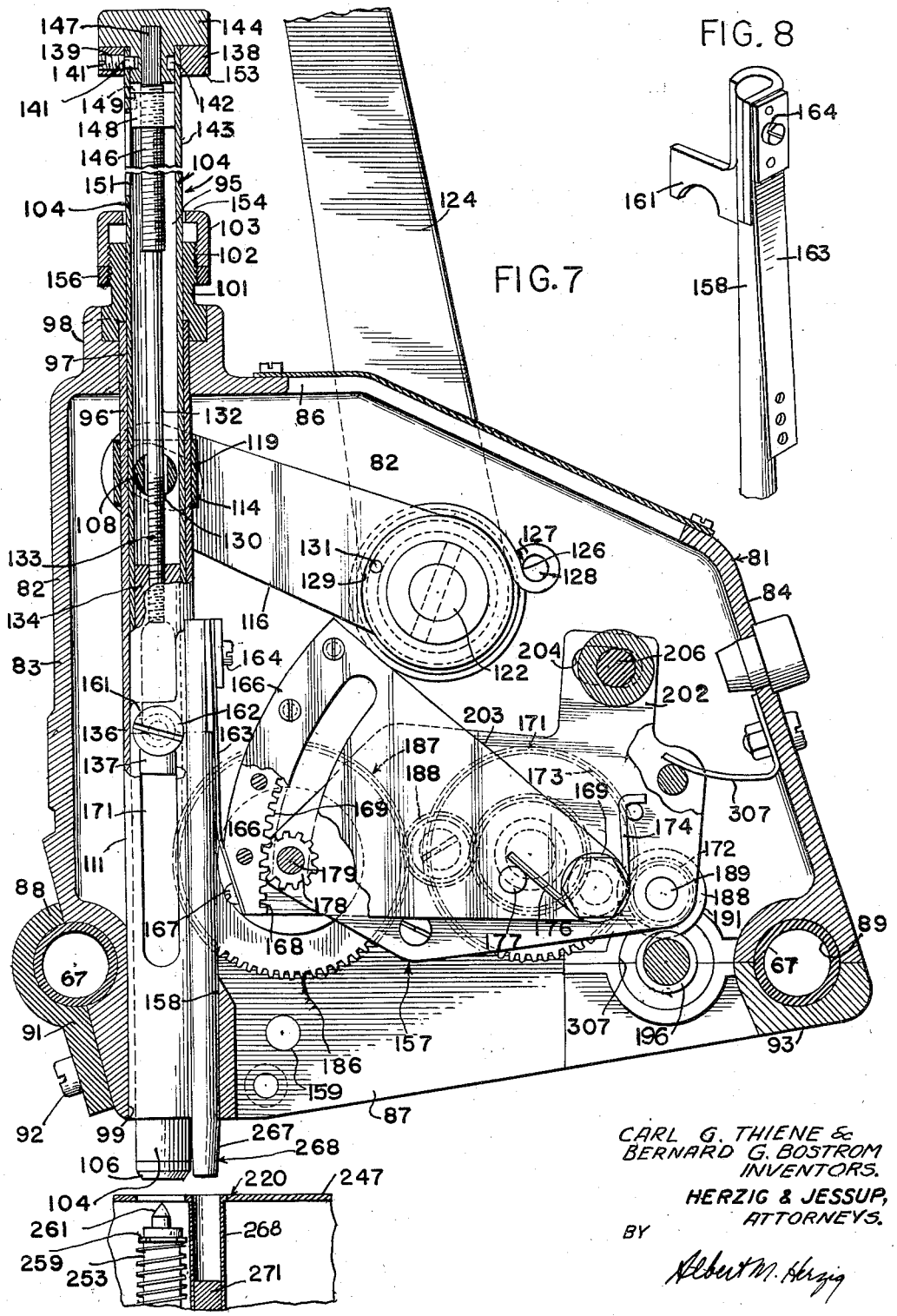

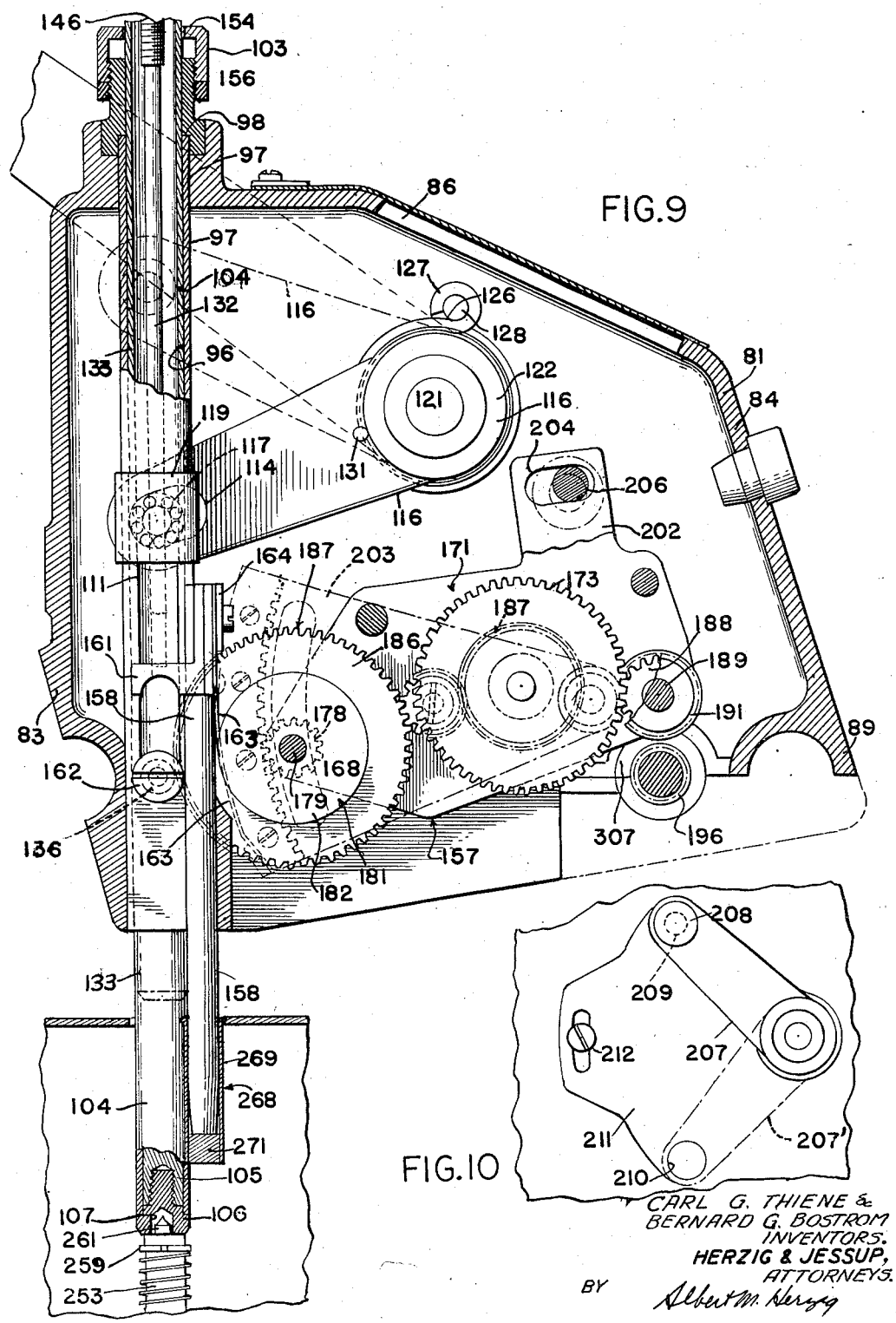

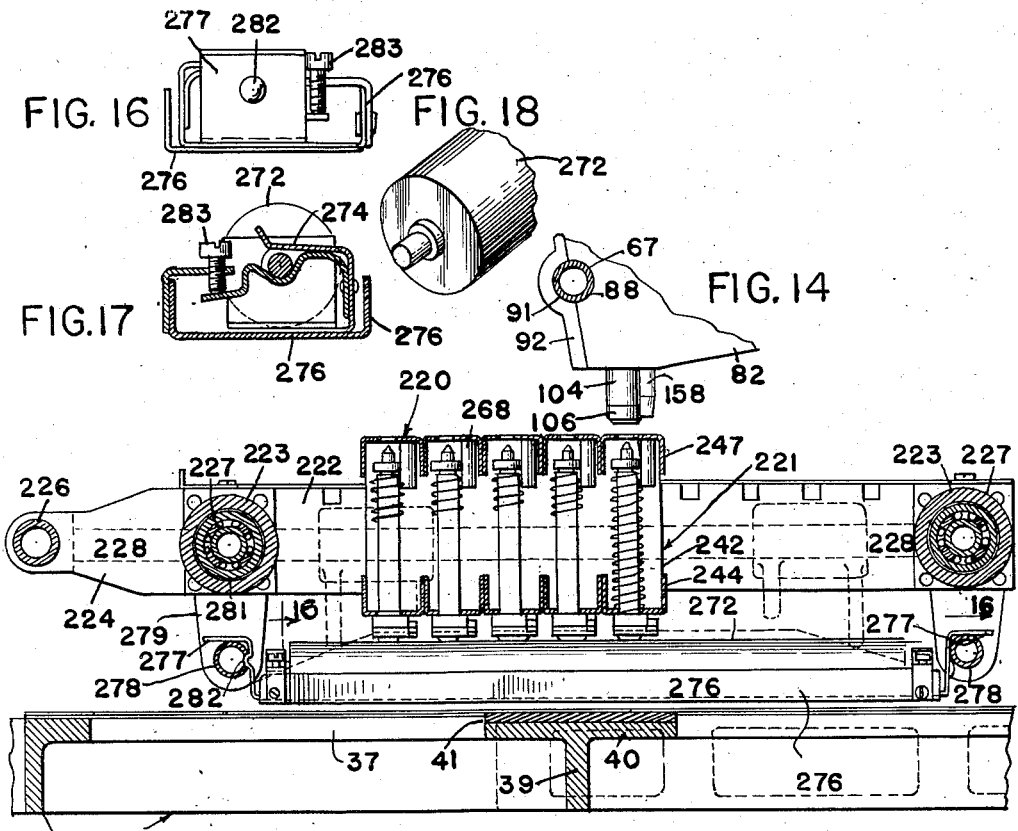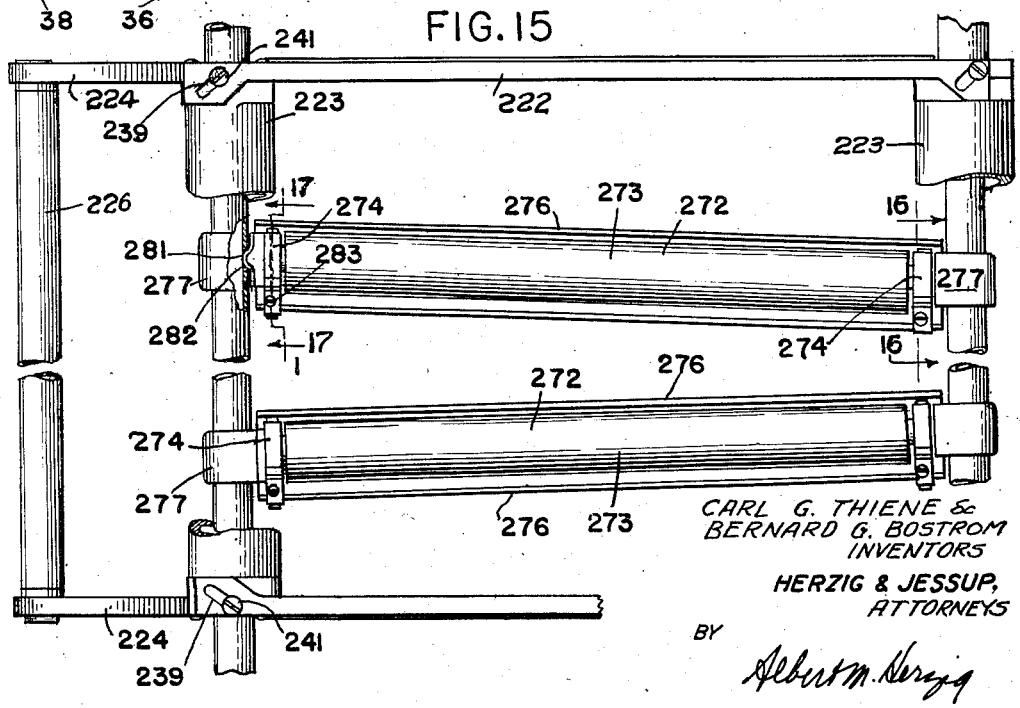

Feb. 10, 1959 C. G. THIENE ET AL 2,873,013
PRINTING MACHINE
Filed Feb. 8, 1957 10 Sheets-Sheet 8

CARL G. THIENE &
BERNARD G. BOSTROM
INVENTORS.
HERZIG & JESSUP,
BY ATTORNEYS.

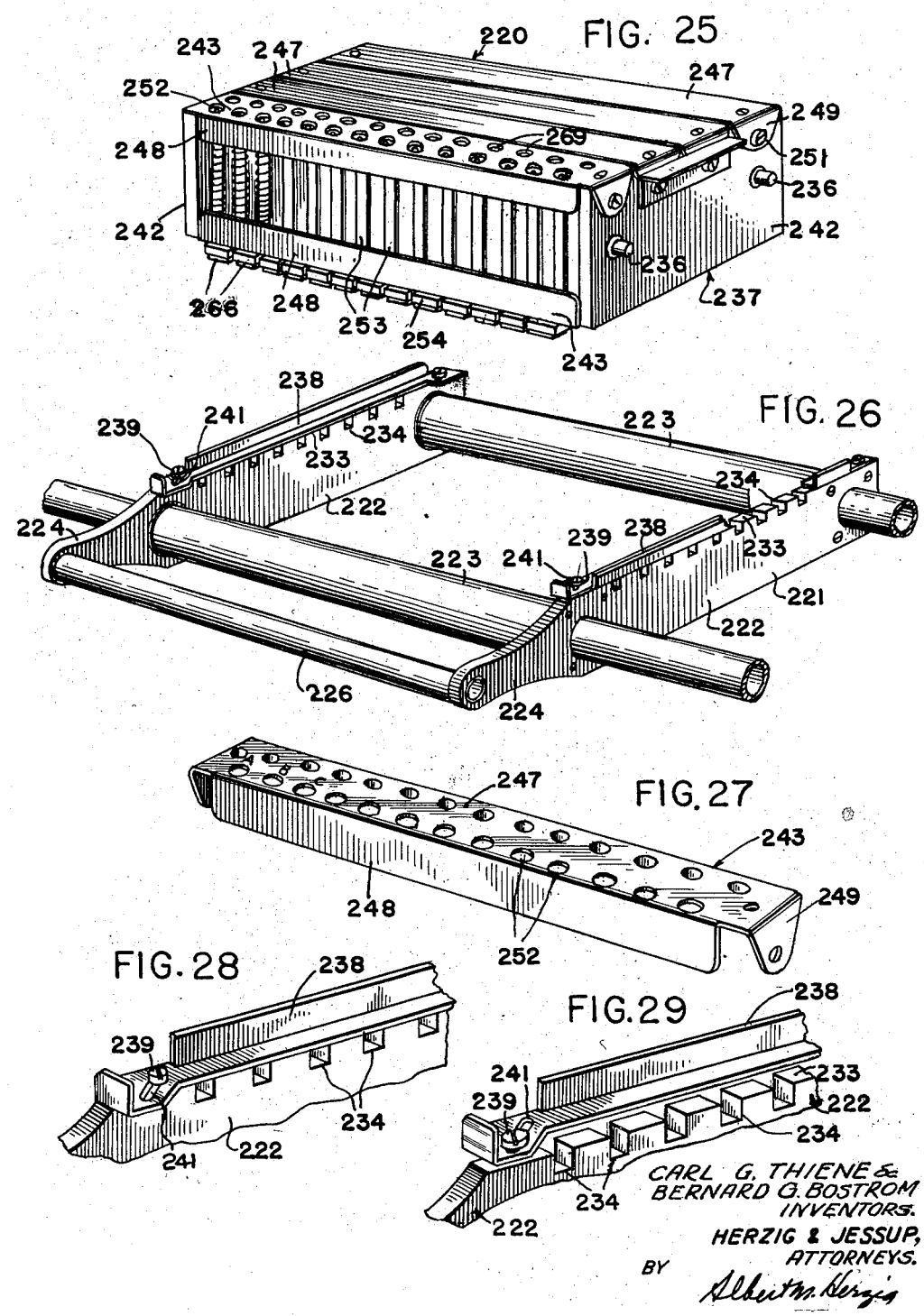

Feb. 10, 1959 C. G. THIENE ET AL 2,873,013
PRINTING MACHINE
Filed Feb. 8, 1957 10 Sheets-Sheet 10
FIG. 30
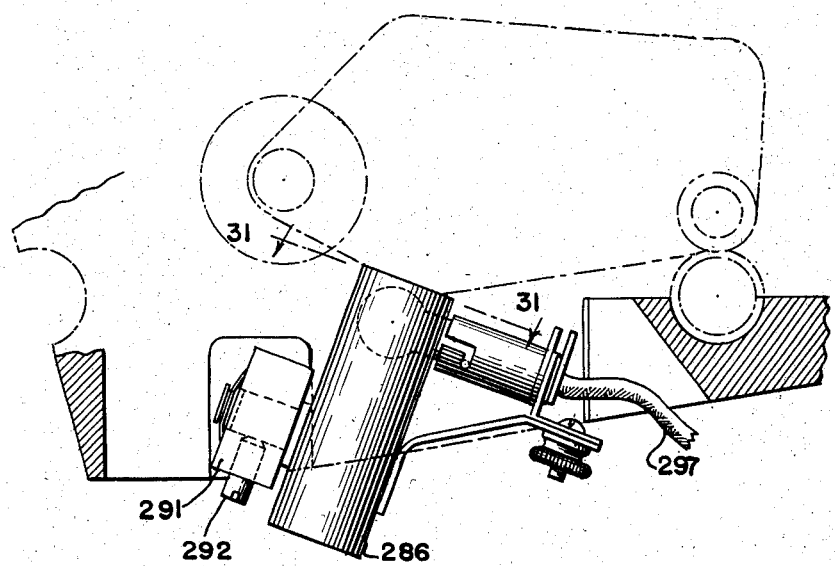
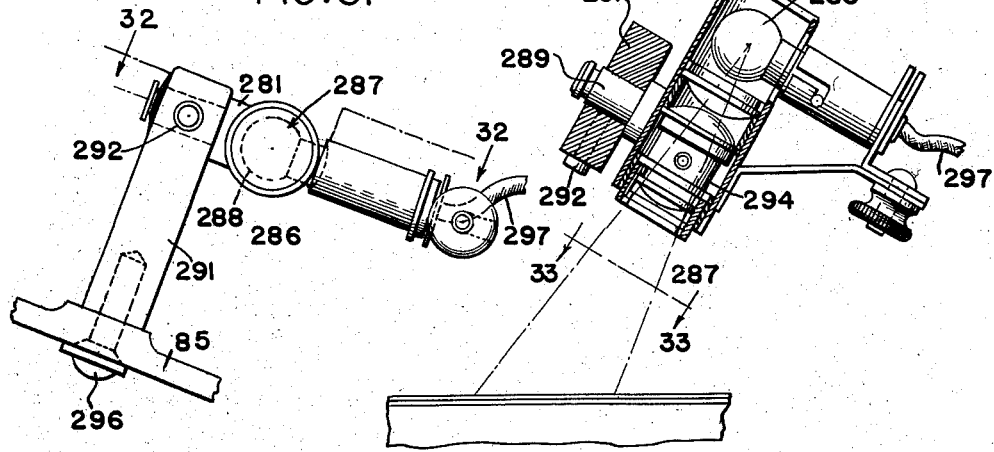
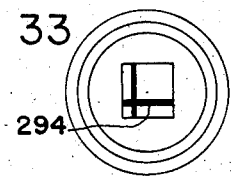
CARL G. THIENE &
BERNARD G. BOSTROM,
INVENTORS.
HERZIG & JESSUP,
BY ATTORNEYS.

United States Patent Office 2,873,013
Patented Feb. 10, 1959

2,873,013

PRINTING MACHINE

Carl G. Thiene, Pasadena, and Bernard G. Bostrom, Van Nuys, Calif., assignors to Reynolds Pen Company, Pacoima, Calif., a corporation of Florida Application February 8, 1957, Serial No. 639,040

16 Claims. (Cl. 197—2)

This invention relates to a printing machine, and more particularly to a new and improved printing machine for printing signs, show cards, visual presentations, and the like.

It is an object of this invention to provide a new and improved printing machine that is relatively portable yet sturdy in construction, and capable of mass production and interchangeability of parts.

Another object of this invention is the provision of new and improved compact and accurate structural elements in a machine of the character described whereby mass production at minimum cost is achieved while facilitating accurate machining from conveniently accessible locations where critical dimensions are established.

It is also an object of this invention to provide a new and improved printing machine that is easily and quickly operated with a high degree of accuracy and precision by timing to print one letter at a time.

It is another object of this invention to provide a new and improved printing machine that provides improved carriage means to support printing type in readiness for instant use within the machine.

It is a further object of this invention to provide in a new and improved printing machine of the desired character described means for automatically spacing the distance between printed characters according to the size thereof.

It is another object of this invention to provide a printing machine incorporating new and improved provision for indexing, and an actuator to depress and print specific or individual type.

It is another further object of this invention to provide new and improved bed means and positioning means in such a printing machine which is calibrated to facilitate the precise lay-out and treatment of printed matter.

It is another object of this invention to provide a printing machine that provides new and improved illuminated means for orientating the machine to the card or paper board to be printed.

Another object of this invention is to provide a new and improved means to vary the amount of pressure applied to individual types to compensate for varying sizes of type in a machine of the general character described.

Yet another object of this invention is to provide means within such a printing machine to interchange the size and style of type by providing interlocking faceplates for said type pieces.

Still another further object of this invention is to provide a printing machine that provides improved automatic inking means to apply ink to the type during the printing operation.

It is an object of this invention to provide a new and improved printing machine which overcomes disadvantages of prior methods and devices heretofore intended to accomplish similar purposes i. e. for printing signs, show cards and the like.

These and other objects of this invention will be readily apparent to one skilled in the art from the following detailed description of the drawings, wherein:

Figure 1 is a plan view in elevation of a preferred embodiment of a printing machine according to this invention with parts broken away for clarity;

Figure 2 is a side view in elevation of a printing machine;

Figure 3 is an end view in elevation as seen from the right side of Figure 2;

Figure 4 is a plan view in elevation of a portion of the printing machine showing the bed and a portion of a lower frame member;

Figure 5 is a side view in elevation of the type-carrier of this machine;

Figure 6 is an enlarged vertical sectional view showing the means of supporting the type-carrier of this machine;

Figure 7 is an enlarged vertical sectional view of the spacing head of this machine as taken on a line 7—7 of Figure 11;

Figure 8 is an enlarged fragmentary perspective view showing a space selector plunger in greater detail;

Figure 9 is an enlarged vertical sectional view of the spacing head, similar to Figure 7, showing relative parts in a downmost or printing position;

Figure 10 is an enlarged fragmentary view in elevation showing a manual means for adjustment of a portion of this machine as seen on a line 10—10 of Figure 11;

Figure 11 is an enlarged horizontal sectional view with parts broken away for clarity, as taken on a line 11—11 of Figure 2;

Figure 12 is an enlarged perspective view of the gear mechanism and mounting thereof of the spacing head;

Figure 13 is an enlarged fragmentary side view of a finger control for the spacing head as seen on a line 13—13 of Figure 1;

Figure 14 is an enlarged vertical sectional view as taken on a line 14—14 of Figure 2;

Figure 15 is a plan view in elevation of the ink rollers and component parts thereof, with parts broken away for clarity;

Figure 16 is an enlarged horizontal sectional view as taken on a line 16—16 of Figure 14;

Figure 17 is an enlarged horizontal sectional view as taken on a line 17—17 of Figure 14;

Figure 18 is an enlarged perspective view of an end of one of the ink rollers;

Figure 19 is an enlarged bottom plan view showing a portion of the type case according to this invention;

Figure 20 is an enlarged vertical sectional view as taken on a line 20—20 of Figure 19;

Figure 21 is an enlarged fragmentary top plan view of a portion of the type carrying case;

Figure 22 is an enlarged perspective view showing a type-key used in this machine in greater detail;

Figure 23 is an enlarged bottom plan view of an upper portion of said type-key;

Figure 24 is an enlarged plan view of a lower portion of said type-key;

Figure 25 is an enlarged perspective view of a type-carrying case;

Figure 26 is an enlarged perspective view of the support means for the type-carrying case;

Figure 27 is an enlarged perspective view of a channel section used in the type-carrying case;

Figure 28 is an enlarged fragmentary perspective view of a portion of the support means of Figure 26;

Figure 29 is an enlarged fragmentary perspective view similar to Figure 28 showing a changed position thereof;

Figure 30 is an enlarged fragmentary view of the indicator lamp installation;

Figure 31 is an enlarged fragmentary plan view as seen on a line 31—31 of Figure 30;

Figure 32 is an enlarged vertical sectional view as taken on a line 32—32 of Figure 31; and Figure 33 is an enlarged sectional view as taken on a line 33—33 of Figure 32.

Referring more particularly to the drawings, there is shown, by way of illustration but not of limitation, a preferred embodiment of a printing machine designated generally by the numeral 35.

The printing machine 35 includes a substantially rectangular base 36 with a relatively rigid bed plate 37 preferably of a non-warping construction such as cast-iron, cast-aluminum or the like with downwardly extending peripheral flanges 38 and longitudinal reinforcing ribs 39. The ribs 39 act as stiffening members for a printing station or platform 40 at a central portion of the base, which may be recessed to receive an impression pad 41. The pad 41 is preferably formed of a relatively resilient material such as rubber, or the like, to resiliently receive the impression force of type as will be later described.

A plurality of adjustable legs 42 may be provided at the underside of the base 36 for the purpose of leveling the base in a horizontal plane, and may include locknuts 43.

A pair of opposing elongated rails or tracks 44, 46 are adjustably or otherwise mounted at opposing parallel, longitudinal front and rear edges of the base 36 respectively and extend outwardly thereof, and are preferably secured at the outer ends as by tie-rods 47 to form longitudinal trackways with substantially flat, upper, horizontal surfaces. The track 44 is preferably mounted substantially flush with the top of the front edge of the base 36, whereas the track 46 is preferably elevated above the rear edge of the base to clear a card-holder assembly 49.

The card-holder assembly 49 supports a card or paper board 51 in a substantially horizontal plane, movable transversely of the base 36 to feed the card 51 forwardly and rearwardly, and position said card for printing. The card-holder includes a pair of tubular guide members 48, clamped or otherwise fixed along the sides of the base 36 as by clamps 52 and nuts and bolts 53. A pair of slides or rods 54 extend forwardly of the guides 48 and telescope within the guides, and are spanned at the forward ends thereof with an elongated spring clip member 55. The clip 55 is preferably formed of a flat strip of metal bent or folded rearwardly at an elongated central portion 56 thereof to form a resilient frictional clamp for the card 51. The ends 57 may be rolled over the rods 54 or otherwise secured thereto to move forwardly or backwardly as the rods 54 slide inwardly or outwardly within the guides 48. Additional spring clamping fingers 58 may be optionally provided at the outer ends 57 of the clip 55 to accommodate and clamp oversize cards.

The top surface of the base 36 is preferably scored or otherwise calibrated as indicated generally at 59 to provide guide lines to facilitate positioning of the card 51 for printing, and may include indicia as shown in Figure 4, or be otherwise marked.

If preferred, the top surface may be optionally provided with a removable sheet or plate of metal or relatively rigid paper-board or with a variety of such sheets, each with a different scale or indicia to facilitate printing layouts of varying scales.

A pair of spaced guide brackets 61 is provided at the rear edge of the base 36 and may be optionally integral with the base. Each bracket 61 includes a substantially vertical upwardly extending portion 62 and a substantially horizontal portion 63 extending forwardly and transversely over the base 36, in a spaced relationship to the base.

A pair of apertures 64, the axes of which are substantially parallel to the longitudinal axis of the base 36, is provided in each horizontal portion 63. The apertures 64 of each horizontal portion 63 are substantially in a common horizontal plane and are aligned with the apertures 64 of the opposing horizontal arm portion 63, to provide a guide means for a longitudinal sliding track means 66.

The track 66 includes a pair of elongated cylindrical or otherwise shaped rods 67 extending through the apertures 64 of the bracket portions 63 and terminating at the ends in longitudinally aligned apertures 68 of a pair of substantially vertical arched supporting-beams 69, one on each side of said spaced brackets 61.

The beams 69 include a substantially horizontal central portion 71, in which the aligned apertures 68 are located, and downwardly extending legs 72 terminating in enlarged bosses 73 to form arched beams extending transversely of the base 36. The bosses 73 of each beam 69 are apertured in alignment to receive a transverse slideway 74 of a cylindrical or other configuration.

A slideway 74 extends through a rear boss 73 of each beam 69 and rotatably supports a roller 76, preferably in a non-friction ball-bearing connection. The slideway 74 at its forward end is secured in the forward boss 73 by a cap screw 77 or the like. The cap screw 77 also provides means to secure a downwardly inclined extension 78 of the forward depending leg 72. A roller 79 similar to roller 76 is rotatably mounted on the lowermost extremity of said extension 78.

It will be apparent from the foregoing description that the printing machine is provided with a pair of arched supporting means 69 transversely related to the bed 36, joined together by a pair of longitudinal tracks 66 which extend through and are axially guided by the pair of guide brackets 61, to form a bridging structure provided with rollers 79, 76. The rollers 79, 76 are mounted substantially at right angles to the beam 69 and are spaced correspondingly to coincide with the longitudinal tracks 44, 46 respectively of the base 36 and to roll thereon.

A type-actuating means, generally referred to by the numeral 81, is fixedly mounted at the central portion of the sliding track means 66 and adapted to move in unison with the track, along the longitudinal axes described.

As best seen in Figures 1, 2, 3, 7, 9 and 11, the type-actuator means 81 includes a hollow cast or otherwise formed housing 82 of box-like configuration with front and rear walls, 83, 84 respectively, side walls 85, a semi-closed top 86, and an open bottom 87. Horizontal semi-circular grooves 88, 89 are provided at thickened portions of the front and rear walls respectively to receive therein the rods 67. The forward rod 67 is clamped within the forward groove 88 by means of a semi-circular clamp 91 and cap screw 92. The rearward rod 67 is clamped within the groove 89 of the rear wall and clamped in a position by an extension 93 of the body.

A type-actuator plunger assembly 95 is positioned at the central and forward portion of the housing 82 for vertical reciprocal movement therein.

The plunger assembly 95 includes a stationary bearing sleeve 96 secured as by brazing or the like within an aperture 97 of an upwardly extending boss 98 of the top wall 86, and extending through the housing 82 and aligned aperture 99 of the thickened portion of the front wall at the lower edge thereof.

Also brazed or otherwise fixed within the boss 98 is an upwardly extending tubular sleeve 101 with external threads 102 at the upper end thereof, to engage interior threads of a stop sleeve 103, the purpose of which will be hereinafter described.

Slidingly disposed within the bearing sleeve 96 is an elongated tubular plunger 104, closed at the bottom end with an insert 105 which is internally threaded to receive a threaded abutment plug end 106. The end 106 preferably contains a guide aperture 107 at the bottom thereof.

A horizontal cross-pin 108 mounted at substantially a central point of the plunger 104 extends through aligned transverse apertures 109 of the plunger, elongated axial slots 111 of the bearing sleeve 96 and aligned transverse apertures 112 of an outer sleeve 112. The cross-pin 108 is provided at one outer end with securement means such as a snap ring 13 or the like. The opposed outer end 118 of pin 108 extends into an arcuate slot 114 of an arcuate arm 116, to form an interconnection of the plunger 104 with the arm 116. A non-friction bearing 117 is preferably provided at the cross-pin end 118 and retained thereon as by a split washer 119 or the like.

The actuator arm 116 is located within the housing 82 in juxtaposition with the plunger assembly 95. The arm 116 is non-rotatably fixed to an inner end of a rotatable shaft 121 which is journalled within an inwardly extending boss 122 of a side wall 85 as by a bushing 123. An elongated handle 124 is non-rotatably fixed to the other end of the shaft 121 at the outer side of the wall 85. The handle 124, shaft 121 and arm 116 form a bell-crank which when rotated by an operator, will transfer a rotary motion of the handle to a vertical motion of the plunger 104 by means of the vertical movement of the cross-pin within the slots 111 of the bearing sleeve 96.

A torque spring 126 is preferably provided coaxially to the shaft 122, with one end 127 abutting a pin 128 on the wall 85, and with the other end 129 engaging an aperture 131 of the arm 116 to urge the arm 116 and plunger 104 into a normal upper position, and return the arm to said upper position when the arm is released by the operator.

The cross-pin 108 is provided with a transverse opening 130 in a central portion thereof within the plunger 104 to provide clearance for an adjustment shaft 132 of decreased diameter. The shaft 132 is externally threaded for a substantial portion of its lower end 133 to engage an internally threaded cylindrical slide 134 below the cross-pin 108. The slide 134 has a sliding fit within the plunger 104 and is provided with a stub shaft 136 transversely fixed at its lower end. The stub shaft 136 extends outwardly and through superimposed vertical slots 137, 111 of the plunger 104 and bearing sleeve 96, respectively.

The upper end of the plunger 104 terminates in an annular collar 138 and is fixed thereto as by a set screw 139, or the like. The set screw 139 preferably has a reduced inner end 141 to engage an annular groove 142 of a depending reduced portion 143 of a knob 144 to retain the knob thereon, yet permit rotary motion of the knob.

The upper end 147 of the shaft 132 is non-rotatably secured within the knob 144. An upper portion of the shaft 142 adjacent to the knob 144 may be externally threaded as at 146 to engage an internally threaded sleeve or nut 148 non-rotatably disposed between the shaft 132 and the plunger 104. The sleeve 148 includes a projection 149 extending outwardly into a vertical slot 151 of a plunger 104 and slidable within said slot for a reciprocal axial movement.

As can be clearly understood by the foregoing description of the adjustment means, manual rotation of the knob 144 rotates the shaft 132. The slide plug 134 at the lower end of the shaft 132, being keyed to the plunger 104 and bearing sleeve 96 by the stub shaft 136, will be raised or lowered by the thread 133. A clockwise rotation of the knob 144 will raise the slide 144 and stub shaft 136 and conversely, counterclockwise rotation will lower the slide and stub shaft, adjusting the relative position of the stub shaft within the plunger.

The projection 149 preventing the nut 148 from rotating will also raise or lower and record the axial movement of the stub shaft 136 relative to indicia inscribed on the outer surface of the plunger 104 adjacent the slot (see Figure 2).

It will now be understood by the foregoing description of the plunger and adjustment means that a forward manual rotation of the handle 124 will lower the plunger 104 through the shaft 122, arm 116, and cross-pin 108, from an uppermost position wherein the cross-pin 108 is held in abutment with the upper end of slot 111 of the bearing sleeve 96 by the torque spring 126, to a lowermost position determined by the abutment of the bottom face 153 of the collar 138 against the top face 154 of the threaded stop sleeve 103.

The stop sleeve may be rotated to adjust the downward travel of the plunger to compensate for minute variance of paperboard stock to be printed. A clockwise rotation of the stop sleeve 113 will lower the surface 154 of the sleeve and permit the plunger 104 to travel a greater distance, as for thinner paper-board stock, and conversely a counterclockwise rotation of the stop sleeve will shorten the travel distance of the plunger 104 for stock of greater thickness. A locknut 156 may be provided to secure the stop sleeve at a desired setting.

The outwardly-extending stub shaft 136 serves as an actuator for a type-spacing means generally indicated by the numeral 157. The type-spacing means 157 includes a cylindrical or otherwise shaped shaft 158 slidingly mounted in juxtaposition to the bearing sleeve 96 in a vertical bore 159 adjacent and parallel to but slightly offset from the aperture 99.

The shaft 158 is provided at the upper end thereof with a hook-shaped element 161 which engages with the upper surface of the stub shaft 136. An enlarged head 162 is preferably provided at the end of the stub shaft to retain the hook 161 thereon.

The upper end of a resilient spring-like connector strip 163 is fixed to the upper end of the shaft 158 as by a cap screw 164. The lowermost end of the connector strip 163 is fixed to the lowermost edge of a quadrant gear 166 as by a screw 167 or the like to form a resilient connection between the shaft 158 and the gear 166. The gear 166 is internally toothed as at 168 and adapted to pivot about a pin or bolt 169 mounted on an outer wall of a gear frame 171 within the housing 82.

A torque spring 172 is mounted coaxially with the bolt 169, with one end 173 bearing against a pin 174 located on said outer wall of the gear frame 171 and the other end 176 bearing against a pin 177 located on the quadrant gear 166 to urge the quadrant gear in a downward or counter-clockwise direction. This rotational force urges the hook 161 into abutment with the pin 136 through the connector strip 163. The spring 172 is preferably just strong enough to retain this abutting relationship, but weaker than the torque spring 126 which urges the plunger in a normal uppermost position.

The quadrant gear teeth 169 are meshed with a pinion gear 178 which is mounted on a horizontal shaft 179 of the gear frame 171. The shaft 179 extends to an outer hub 181 of a clutch mechanism 182 which is free to rotate in a counter-clockwise direction. A counterclockwise rotation is imparted by a downward or counterclockwise rotation of the quadrant gear 166 when the plunger 104 and shaft 158 are traveling downwardly.

On the return or upward travel of the plunger 104 the stub shaft 136 carries the hook 161 and shaft 158 upwardly imparting a clockwise rotation to both the quadrant gear 166 and the pinion gear 178.

A clockwise rotation of the pinion gear 178 rotates the inner hub 183 by frictional engagement of cylinders 184 between the inner and outer hubs to rotate an enlarged gear 186 of a gear train 187 within the gear frame 171.

The clockwise rotation of the gear 178 is transmitted through the clutch 182, gear 186 and additional gears of the gear train 187 to a gear 188 of a horizontal shaft 189 and thence to a worm gear 191 fixed to the shaft at the rear of the housing 182.

The shaft 179 is rotatably mounted in an adjustable bushing 192 to form a gear frame bearing point in one side 185 of the housing 82. A shaft 193 of the inner hub 183 of the clutch 182 is rotatably mounted in an adjustable bushing 194 to form a gear frame bearing point in the opposing side 85 of the housing 82. The bearing points define a pivot point about which the gear frame 171 is preferably rotatable to selectively bring the worm gear 191 in and out of engagement with a spirally-grooved shaft 196, and is preferably urged downwardly into such engagement as by a leaf-spring 307 mounted to the rear wall 84. An adjustment screw 310 is preferably provided to receive the thrust loads imparted by the action of the worm gear 191 on the shaft 196.

The spirally-grooved shaft 196 is preferably rotatably supported on and between the guide brackets 61 and has at one end thereof a spur gear 197 meshed with an enlarged gear 198 mounted on an inner wall of a horizontal portion 63 of a bracket 61. The gear 198 is provided with a spring detent 199 to resist rotation thereof and is of a greater diametrical dimension than the width of the horizontal portion 63 to extend above the bracket and be accessible as a finger-control for fine adjustment of the spirally-grooved shaft 196.

As previously mentioned, the worm gear 191 is engageable with the spirally-grooved shaft 196. When the gear frame 171 is in its lowermost position, the counterclockwise rotation is exerted upon the shaft 196. However, since the shaft 196 is prevented from rotation by the detent 199, the force will cause the housing 82 to travel axially along the shaft, to the right as seen in Figure 1, as indicated by the arrow 201, advancing the position of the plunger 104 relative to the printed card.

On the return stroke of the plunger 104, after being depressed, the housing 82 will be advanced as described to space the letters a desired distance.

When the housing 82 has reached its furthermost position to the right of the machine, the worm gear is disengaged from the spirally-shaped shaft 196 to enable the operator to return the housing 82 to a furthermost position to the left or other desired point. In Figure 1, the furthermost position of the housing to the left is indicated in solid lines, whereas the extreme position to the right is indicated in broken lines as at 81'.

An upwardly directed extension 202 with a slot 204 is provided for one of the walls 203 of the gear frame 171. An eccentric pin 206 is provided with an inner end extending into the slot 204 and an outer end rotatably extending through a wall 85 of the housing 82 fixed in a handle 207 outside of the housing. The handle 207 is provided at its outer end with a spring urged pin 208 engageable with upper and lower detents 209, 210 respectively in the wall 85.

To disengage the worm gear 191 from the spirally-grooved shaft 196, the handle 207 is rotated to its uppermost position as shown in Figures 9 and 10 with the pin 208 in the upper detent 209. To engage the worm gear 191 with the shaft 196, the handle 207 is rotated to its lowermost position as shown in Figure 7 with the pin 208 of the lower detent 210 as indicated by the broken lines 207' of Figure 10.

If desired, the detents may be located in an adjustment plate 211 mounted on the wall 85 of the housing 82 and locked in position as by a screw 212 to the wall.

As best seen in Figure 11, the housing 82 is particularly adapted to facilitate the installation of the gear frame 171 and component parts thereof within the housing, while retaining a high degree of accuracy of relationship between parts. The housing is preferably provided with bosses 305, 306 extending inwardly and threaded from the outer side of the housing 82 to receive the externally threaded bearing bushings 192, 194 supporting the shafts 193, 179. It is therefore possible to insert the gear frame 171 through the open bottom 87 and then thread in the bushings 192, 194 until the shafts 193, 179 are accurately positioned and supported.

The housing 82 is further provided with arcuate transverse grooves 307 (see Figure 7) to permit the spirally-grooved shaft 196 to enter therein before the body extension 93 is secured to the body.

To mount the body 82 to the slideways 67, the body is placed upon the slideways with the rearmost shaft 67 occupying the groove 89, the foremost shaft 67 within the groove 88 and the spirally-grooved shaft 196 within the groove 307 before the extensions 93, 91 are secured.

A type-carriage means 220 is elevated above the bed means 36 and below the type-actuating means 81 and is preferably adapted to travel in a horizontal plane, in longitudinal and transverse directions relative to the bed means 36.

The type-carriage means 220 includes a type case support frame 221 comprising a pair of spaced vertical support plates 222 extending transversely of the machine 35 and joined together by a pair of tubular members 223 to form a substantially rectangular frame. Forwardly extending portions 224 of the plates 222 are joined together by a handle 226, preferably but not necessarily of a cylindrical configuration.

The tubular members 223 are provided within the inner diameters thereof with a plurality of ball-bearings 227 to non-frictionally slide or roll on a pair of elongated cylindrical shafts 228 for longitudinal movement of the frame 221.

The shafts 228 are non-rotatably fixed at their ends in support brackets 229 extending transversely of the machine 35. The brackets 229 are provided with outwardly extending ears 231 which terminate in transverse aligned bosses 232. The bosses 232 are apertured to slidingly receive the transverse slideways or shafts 74 of the arched beams 69.

It will now be apparent that the type-case support frame 221 is capable of almost effortless longitudinal travel relative to the machine 35 as by ball-bearing connections to the longitudinal shafts 228 and transverse travel as by the forward and backward movement of the brackets 229 on the transverse slideways 74.

The upper edges 233 of the support plates 222 are provided with a plurality of transverse grooves 234 to supportingly engage outwardly extending stub shafts or pins 236 of a type case 237. The pins 236 are removably retained within the grooves 234 by a lock strip 238 provided at the top edge 233 of each plate 222.

The lock strips 238 are preferably mounted to the plates 222 as by screws 239 extending through diagonal slots 241 at each end of the strips, and cover the grooves 234 to enclose the pins 236. By loosening the screws 239, strips may be shifted outwardly to clear the ends of the pins 236 to permit the lifting out of the type case 237 for servicing or replacement thereof.

The type case 237 comprises a pair of substantially rectangular vertical side plates 242 in which the outwardly extending pins 236 are secured. The side plates 242 are joined by a plurality of elongated channel members 243 with upturned flanges 244. The channel members 243 may be secured at their ends to the bottom edges of the side plates 242 as by cap screws 246 or the like.

The plates 242 are joined at the top by a corresponding number of inverted channel members 247 with downturned flanges 248. The channel members 247 may be secured at their downturned ends 249 to the outer surface of the plates 242 by cap screws 251 or the like.

Each channel like 243 may be provided with a plurality of non-circular apertures 252, linearly arranged throughout its length, to receive elongated type-key stems 253 of a non-circular configuration corresponding to the apertures 252.

The type key stems are provided at their lower ends with enlarged heads 254 which extend on the underside of the channel 243 and abut therewith. Compression springs 256 are disposed coaxially over the stems 253 and are retained thereon by split-ring 257 adjacent the upper ends thereof. The upper ends are preferably provided with a shoulder portion 259 and upwardly extended portion 261 of a reduced tapered diameter.

The enlarged head 254 of the type-key is preferably separable along a horizontal plane to facilitate interchaneability of type faces. As best seen in Figures 22–24, the head 254 comprises an upper portion 262 which is provided with a plurality of projections 263, corresponding with depressions 264 of a lower portion or type face 266. The upper and lower portions 262–266 are cemented or otherwise secured along their opposed faces preferably by a non-permanent cement to enable an operator to separate upper and lower portions to replace the type faces.

The upper channel members 247 are provided with a plurality of apertures 267 corresponding in number to the apertures 252 and vertically aligned therewith. The apertures 267 are preferably of sufficient size to clear the plunger 104 when said plunger is depressed by the handle 126.

As previously mentioned, it is desirable to adjust the spacing of letters during printing and compensate for the varying width of individual letters or characters to be printed. Upon examination of the characters exemplified in Figure 19, it will be seen that the letter A is considerably wider than, for instance, the letter B. To space the letters such as A and B correctly on the card such as 51, the distance that the plunger 104 is advanced must be varied according to this difference in width of the characters.

As previously described, the vertical shaft 158 of the type advancing means 157 defines the amount of longitudinal movement or advancement of the plunger by the arcuate movement of the quadrant gear 166 caused by the upward or return travel of the shaft 158. To adjust this vertical movement of shaft 158 automatically, limit means 268 are provided within the type-case 237 to limit the downward travel of the shaft 158.

For this purpose, a plurality of tubular housings 269 are provided adjoining each aperture 267 of the upper type-case channels 247 positioned relative to said apertures corresponding to the relative position of the shaft 158 to the plunger 104. A plug 271 is provided in the housing 269 and fixed at a predetermined depth corresponding to a required movement for a specific space.

As an example, the lower the plug 271 is secured within the housing 269, the farther down the shaft 158 will be permitted to travel, and the greater upward travel will be imparted to the quadrant gear 166, resulting in a wide space for the succeeding character to be printed. Conversely, the higher the plug 271 is secured within the housing 269, the less the travel of the shaft 158 and quadrant 166, resulting in a narrower space for a succeeding character to be printed.

It is preferable to provide means for varying the amount of pressure applied by a type during printing to compensate for varying areas of type characters. As an example, a larger type requires a greater depressing force than does a smaller type. It is contemplated by this invention that type stems be provided of varying lengths, a longer stem for a larger character and a shorter stem for a smaller character.

With this provision, when the plunger 104 is depressed and brought into contact with a key stem shoulder 259, the larger character type will travel further downward due to a longer stem than will the smaller type character with a shorter stem, applying a greater pressure on the card.

A pair of ink rollers 272 is preferably provided beneath the type-carriage means to constantly apply ink to the underside of the type key faces. The ink rollers 272 preferably consist of an elongated cylindrical body 73 of resilient rubber or the like, rotatably and removably secured in resilient spring retaining members 274 of elongated channel shaped drip pans 276. The ends 77 of the pan 276 are preferably bent upwardly and outwardly to form outwardly extending hangers or hooks to overhang and be supported by a pair of elongated shafts 278.

The shafts 278 are secured at their ends in depending lugs 279 of brackets 229. The drip trays 276 are preferably positioned one on either side of the plunger means 95 and slightly convergent. The trays 276 are retained in position by dimples 281 of the hooks 277 engaging apertures 282 of the shafts 278. The ink rollers 272 may be adjusted to insure complete contact with the undersurface of the keys by adjustment screws 283, and as best seen in Figure 15, the rollers are preferably disposed in a non-parallel or angular relationship to each other to insure a maximum inking surface applicable to the key faces.

To facilitate orientation of the letters to be printed relative to the card like 51, an illuminated indicator means 285 is provided at the underside of the housing 82. As best seen in Figures 30–33, the indicator means 285 comprises a tubular lamp housing 286 which includes a lens assembly 287 and a lamp bulb 288. The lamp housing 286 is inclined downwardly and is pivotally mounted as by a transverse stub shaft 289 extending into a bracket 291 and secured therein as by a set screw 295. The bracket is preferably mounted to a side wall 85 of the housing 82. A transparency 293 is disposed in the lens system 287 to be projected downwardly when the lamp 288 is illuminated.

A preferred form of illuminated pattern is best seen in Figures 4 and 33 wherein cross hairs 294 are projected on a spot immediately below the plunger 104, to indicate the spot where the character will be printed.

To adjust the projected pattern in the proper position, a mounting screw 296 may be loosened and the bracket 291 rotated for longitudinal adjustment. The screw may then be tightened, and the screw 292 loosened to facilitate rotation of the housing about the pivot stub shaft 289 for transverse adjustment.

A cable 297 may be furnished to the source of electrical current such as a transformer 298. A switch 299 is preferably provided at the forward end of the base 36 within instant reach of the operator.

A platform 300 is preferably detachably mounted to one of the beams 69 to provide storage space for an ink container or the like.

*Operation*

To operate the printing machine 35, the cardholder 49 is first drawn forward and a suitable card or paperboard 51 inserted in the clip 55. The cardholder 49 is then shifted forward or back until the card 51 is aligned as desired. The light switch 299 is turned to an "on" position to illuminate the lamp 288 of the lamp housing 286 and project the cross-hairs 294 upon the card 51. The shaft disengagement handle 207 is raised to its uppermost position 209 to disengage the worm gear 191 from the spirally-grooved shaft 196 to free the spacing head 81. The head 81 is then shifted manually to the left to the desired position until the cross lines 294 indicate the desired spot for the first letter to be printed.

The handle 207 is then lowered to its lowermost position 210 to engage the worm gear 191 with the shaft 196. The plunger assembly 95 is at this time directly above the illuminated spot 294.

The operator may then grasp the type-carrier means 220 by the handle 226 to position the desired type character in vertical alignment with the plunger assembly, The type-carrier assembly 220 is shifted to the left or to the right along the slideway 228, and/or forwardly or backwardly along the transverse slideway 74 until the desired letter or character is aligned with the plunger 104. This shifting to the left or right or both and forwardly and rearwardly or diagonally causes the underside faces of the type to come in contact with the ink rollers 272 to receive a coating of ink.

The operator then pulls forward on the handle 124 to rotate the handle downwardly which rotates the shaft 122 and arm 116 to move the cross-pin 108 in a downward direction. The cross-pin 108 will then pull down the plunger 104 until the underside face 153 of the collar 138 abuts the uppermost face 154 of the adjustment sleeve 103. At this time, the plunger head 106 will enter an aperture 267 and contact the abutment shoulder 259 of a type stem 253. Downward motion of the plunger will depress the stem against the force of a spring 256 to bring a type face 266 in contact with the paperboard 51.

At the same time, the shaft 158 is drawn downwardly by the spring 172 with the hook 161 in contact with the stub shaft 136. The shaft 158 will enter a corresponding housing 269 to a depth permitted by a plug 271. When the shaft 158 has bottomed in the housing 269, the plunger will continue downward removing the pin 136 from the hook 161. Upon release of the handle 124, return spring 126 will raise the plunger until the pin 136 picks up the hook 161 to raise the shaft 156 and rotate the quadrant gear 166. The gear 166 will rotate the pinion 178 and clutch 182, through the gear train 187, will rotate the worm gear 191 to advance the head 82 relative to the shaft 196.

The type-carriage means 220 is then again manipulated forward and back, left and right and/or diagonally until the next desired character is located in vertical alignment with the plunger assembly 95, and the previously described operation is repeated to print such a letter.

When a printed line has been completed, the handle 207 is again actuated to release and disengage the worm gear from the spiral shaft to permit movement of the head 82 to a desired position to the left. The card 51 is pushed forward by the cardholder 49 to position the card for the next line.

While I have herein shown and described what I conceive to be the most desired form of my invention, it is to be understood that alterations and modifications thereof may be made in a manner to satisfy the spirit of my invention which is intended to comprehend any and all equivalent devices as comprehended in the following claims.

Having thus described our invention, what we claim as new and desire to secure by Letters Patent is:

1. A printing machine comprising a horizontal substantially rectangular bed means having a central portion longitudinally calibrated to index a paperboard or the like, and longitudinal elevated track means along the side edges thereof, a pair of guide bracket means supported on said bed means and extending upwardly and transversely over a central portion of said bed means, a pair of arched supporting beam means spanning said bed means having roller means at each end thereof movable on said track means, said beam means having a pair of aligned apertures, a transverse slideway means spanning said arched supporting beam means, guide means on said guide bracket means, a pair of longitudinal slideway means, extending through said guide means of said guide bracket means and fixed to said supporting beam means, a spirally-grooved shaft adjustably supported on and between said guide bracket means, a type-actuating means fixedly mounted on said longitudinal slideway means between said guide brackets and a type-carriage means disposed below said type-actuating means and slidably mounted on said transverse slideway means to carry a plurality of type.

2. A printing machine according to claim 1, including a spacing means for automatically advancing said type-actuating means to space indicia printed by said type, said spacing means being engageable with said spirally-grooved shaft.

3. A printing machine according to claim 2 wherein said bed means includes a movable holding means to hold said paperboard in position to be printed and a flexible, compressible impression means aligned with said type-actuating means.

4. A printing machine according to claim 3 wherein said type-carriage means has pressure adjustment means to vary the printing pressure according to the size of the type.

5. A printing machine according to claim 1, said type-actuating means including an adjustable type-advancing means, said type-carriage means having a limit means and said adjustable type-advancing means having cooperating engagement with said limit means to space each type printed by said type-actuating means for a predetermined distance variably determined by the type width plus an adjustable constant distance established by said adjustable type-advancing means.

6. A printing machine comprising a horizontal, substantially rectangular bed means having holding means to support a paperboard or the like in position to be printed, a type-carriage means elevated above said bed means and adapted to travel in a horizontal plane in longitudinal and transverse directions, a type-actuator means elevated above said type-carriage means and adapted to travel in a horizontal plane in a longitudinal direction and an ink supply means adjacent said type-carriage means to apply printing ink to the underside of type carried by said type-carriage means.

7. A printing machine comprising base means having calibration means at the central portion thereof, and a card-holding means to adjustably support a paperboard card or the like, a pair of guide bracket means extending upwardly and transversely thereof having aligned apertures, a plurality of arched supporting beam means transversely spanning said base means and adapted to travel longitudinally thereon, said beam means having aligned apertures corresponding to the aligned apertures of said guide bracket means, a corresponding number of slideway means extending through said guide bracket means and having the ends thereof fixed in the aligned apertures of said arched supporting beam means, a spirally-grooved shaft adjustably fixed between said guide bracket means, a type-actuating means having a vertical plunger means and a handle means, said handle means operatively connected to selectively lower the plunger means, said plunger means being upwardly biased by a spring, a type-advancing means having a gear train operatively connecting said plunger means to said spirally-grooved shaft, a clutch to longitudinally advance said type-actuating means when said handle means is raised, and a type-carriage means disposed below said type-actuating means and above said base means, adapted to travel in a horizontal plane in longitudinal and transverse directions, and having adjustable limiting means cooperable with said type-advancing means to limit the type-advancement.

8. A printing machine according to claim 7 wherein said type-advancing means has releasing means to disengage said gear train from said spirally-grooved shaft.

9. A printing machine according to claim 8 wherein said type-carriage means has a plurality of spring-biased type stems vertically alignable with said plunger means of said type-actuating means, said type stems having replaceable type faces.

10. A printing machine according to claim 8 wherein said type-carriage means has a plurality of replaceable spring-biased type stems vertically alignable with said plunger means of said type-actuating means, said type stems having replaceable type faces.

11. A printing machine according to claim 8 wherein said type-carriage means has a substantially rectangular type-holding case means and a transverse type-holding case supporting means having a pair of transverse substantially vertical walls, a locking means along the upper edge of said vertical walls, said type-holding case means having a pair of substantially vertical end walls and a plurality of outwardly extending pins, said pins extending beyond the end walls to releasably engage said locking means and to be supported thereby, and a plurality of upper and lower channel members, said channel members connecting said end walls and having a plurality of spring-biased type stems therebetween, vertically alignable with said plunger means of said type-actuating means, said stems having replaceable type faces.

12. A printing machine according to claim 11 wherein said type-holding case includes pressure adjustment means for said stems.

13. A printing machine according to claim 12 wherein said type-actuating means includes an orientating means to position said plunger means with said paperboard card.

14. A printing machine comprising a stationary frame having a horizontal bed means, a movable frame means mounted for movement in a horizontal plane on said stationary frame and spaced upwardly from said bed means, said movable frame means including a type-carriage means, a plurality of individual type means in said type-carriage means mounted for individual vertical reciprocating movement relative to said bed means, type-actuating means on said movable frame means for individually selectively actuating said individual type means for printing on said bed means, and indicator means on said movable frame means adapted to index said individual type means respectively with a desired position on the bed means.

15. A printing machine according to claim 14, said type-carriage means being independently movable in a horizontal plane on said movable frame means, means associated with said type-actuating means and actuated by the type-actuating means for automatically progressively advancing said movable frame means a predetermined distance corresponding to the width of respective said individual type means and manually operable means for moving said type-carriage means independently of said movable frame means.

16. A printing machine according to claim 15, including means for replaceably mounting said type-carriage means on said movable frame means.

References Cited in the file of this patent

UNITED STATES PATENTS

| | | |
|---|---|---|
| 2,115,692 | Thorn | Apr. 26, 1938 |
| 2,670,831 | Barrett et al. | Mar. 2, 1954 |